(12) United States Patent
Wen

(10) Patent No.: US 6,517,040 B1
(45) Date of Patent: Feb. 11, 2003

(54) SUPPORT UNIT FOR A DISPLAY DEVICE

(75) Inventor: Meng-Ru Wen, His-Chu (TW)

(73) Assignee: MITAC International Corp., Hsinchu Hsien (TW)

( * ) Notice: Subject to any disclaimer, the term of this patent is extended or adjusted under 35 U.S.C. 154(b) by 0 days.

(21) Appl. No.: 10/055,651

(22) Filed: Jan. 22, 2002

(30) Foreign Application Priority Data

Dec. 20, 2001 (TW) ....................................... 90201759 U

(51) Int. Cl.[7] .............................. E04G 3/00; A47F 7/14; A47F 1/16; F16M 11/00; F16M 13/00
(52) U.S. Cl. ................................ 248/278.1; 248/282.1; 248/284.1; 248/9.7; 248/919; 248/920; 248/921; 248/923
(58) Field of Search .......................... 248/278.1, 279.1, 248/282.1, 919, 920, 921, 923, 917, 284.1

(56) References Cited

U.S. PATENT DOCUMENTS

| | | | | |
|---|---|---|---|---|
| 2,278,356 A | * | 3/1942 | Livingston | ............... 248/278.1 |
| 5,709,360 A | * | 1/1998 | Rosen | ...................... 248/278.1 |
| 5,992,809 A | * | 11/1999 | Sweere | ..................... 248/278.1 |
| 6,145,797 A | * | 11/2000 | Uehara | ..................... 248/291.1 |
| 6,189,842 B1 | * | 2/2001 | Bergeron | ........................... 24/8 |
| 6,347,433 B1 | * | 2/2002 | Novin | .......................... 16/367 |
| 6,367,756 B1 | * | 4/2002 | Want | ....................... 248/278.1 |
| 6,378,830 B1 | * | 4/2002 | Lu | ............................ 248/278.1 |
| 6,394,403 B1 | * | 5/2002 | Hung | ...................... 248/276.1 |

* cited by examiner

Primary Examiner—Anita King
Assistant Examiner—Amy J. Sterling
(74) Attorney, Agent, or Firm—Merchant & Gould P.C.

(57) ABSTRACT

A support unit is used for supporting a display device having a displaying face, and includes an axle mounted rotatably on a seat. The axle defines a first axis that is parallel to the displaying face, and has a cylindrical outer surface surrounding the first axis. The axle is rotatable about the first axis relative to the seat. A coupling unit interconnects the display device and the cylindrical outer surface of the axle in a manner such that the display device is rotatable relative to the axle about a second axis that is transverse to the first axis and the displaying face. An upright support member supports the seat from below in such a manner that the seat is turnable relative to the upright support member about a third axis transverse to the first and second axes.

9 Claims, 3 Drawing Sheets

SUPPORT UNIT FOR A DISPLAY DEVICE

BACKGROUND OF THE INVENTION

1. Field of the Invention

The present invention relates to a support unit, more particularly to a support unit for a display device.

2. Description of the Related Art

A conventional support unit for a display device, such as a monitor, generally includes a base support with a horizontal plate that is formed with a concave portion so that a convex bottom of the display device can be mounted therein. The display device is limitedly rotatable relative to the base support about a vertical axis and a horizontal axis that is transverse to the vertical axis.

SUMMARY OF THE INVENTION

The object of the present invention is to provide a support unit for a display device such that the display device is capable of rotating about three axes on the support unit so as to enhance flexibility of the display device during use.

Accordingly, a support unit of the present invention is adapted to support a display device having a displaying face. The support unit includes a seat, an axle, a coupling unit, and an upright support member. The axle is mounted rotatably on the seat, defines a first axis that is parallel to the displaying face, and has a cylindrical outer surface surrounding the first axis. The axle is rotatable about the first axis relative to the seat. The coupling unit interconnects the display device and the cylindrical outer surface of the axle in a manner such that the display device is rotatable relative to the axle about a second axis that is transverse to the first axis and the displaying face. The upright support member supports the seat from below in such a manner that the seat is turnable relative to the upright support member about a third axis transverse to the first and second axes.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
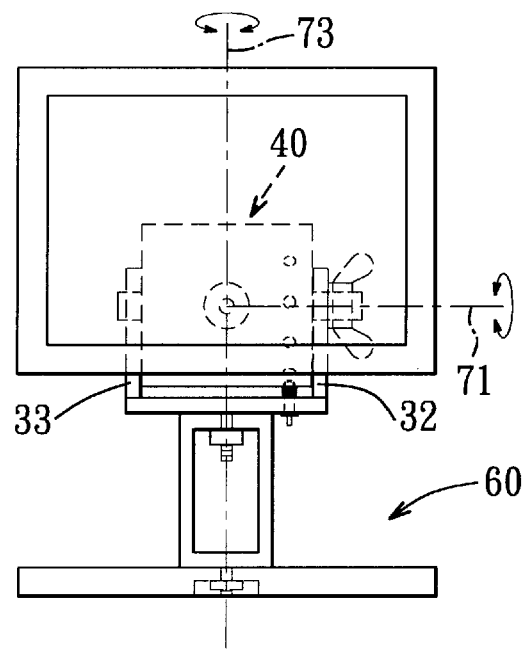
FIG. 1 is a schematic front view of a preferred embodiment of a support unit for supporting a display device.

Before the present invention is described in greater detail with reference to the following preferred embodiments, it should be noted that same reference numerals have been used to denote similar elements throughout the specification.

Referring to FIGS. 1 to 4, a preferred embodiment of a support unit of the present invention is shown to be adapted to support a display device or a monitor 50 that has a displaying face 53, and includes a seat 30, an axle 40, a coupling unit, and an upright support member 60.

As illustrated, the axle 40 is mounted rotatably on the seat 30, defines a first axis 71 that is parallel to the displaying face 53, and has a cylindrical outer surface 43 surrounding the first axis 71. The axle 40 is rotatable about the first axis 71 relative to the seat 30.

The coupling unit, in the form of a threaded shaft 431 and fastener nuts 55, interconnects the display device 50 and the cylindrical outer surface 43 of the axle 40 in a manner such that the display device 50 is rotatable relative to the axle 40 about a second axis 72 that is transverse to the first axis 71 and the displaying face 53.

The upright support member 60 supports the seat 30 from below in such a manner that the seat 30 is turnable relative to the upright support member 60 about a third axis 73 transverse to the first and second axes 71,72.

The seat 30 preferably includes two spaced apart upright mounting plates 32,33 between which the axle 40 is journalled, and a bottom plate 31 disposed below the cylindrical outer surface 43, interconnecting the mounting plates 32,33, and having a curved extension 35 which extends in a direction away from the display device 50 and which circumferentially confronts and conforms with the cylindrical outer surface 43. A spring-biased tongue-and-groove retaining device is disposed between the bottom plate 31 and the cylindrical outer surface 43 for positioning the displaying face 53 at a selected angle relative to a vertical plane.

Figure 2:
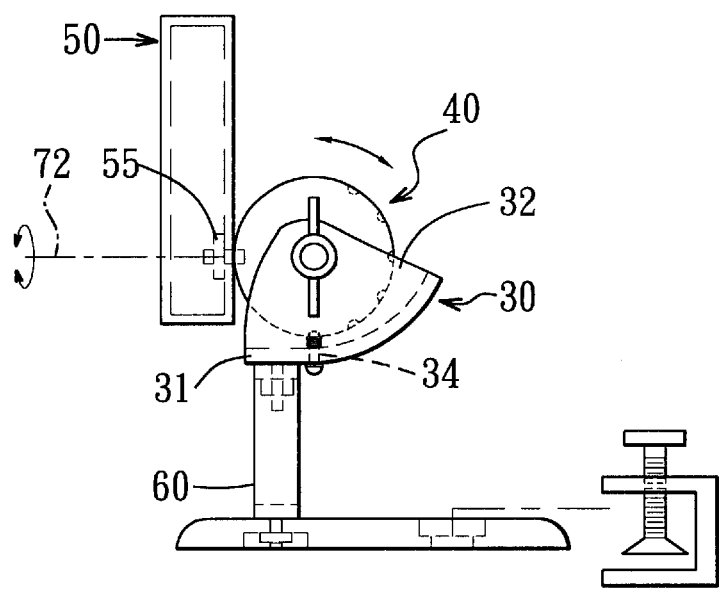
FIG. 2 is a schematic side view of the preferred embodiment shown together with the display device.
Figure 3:
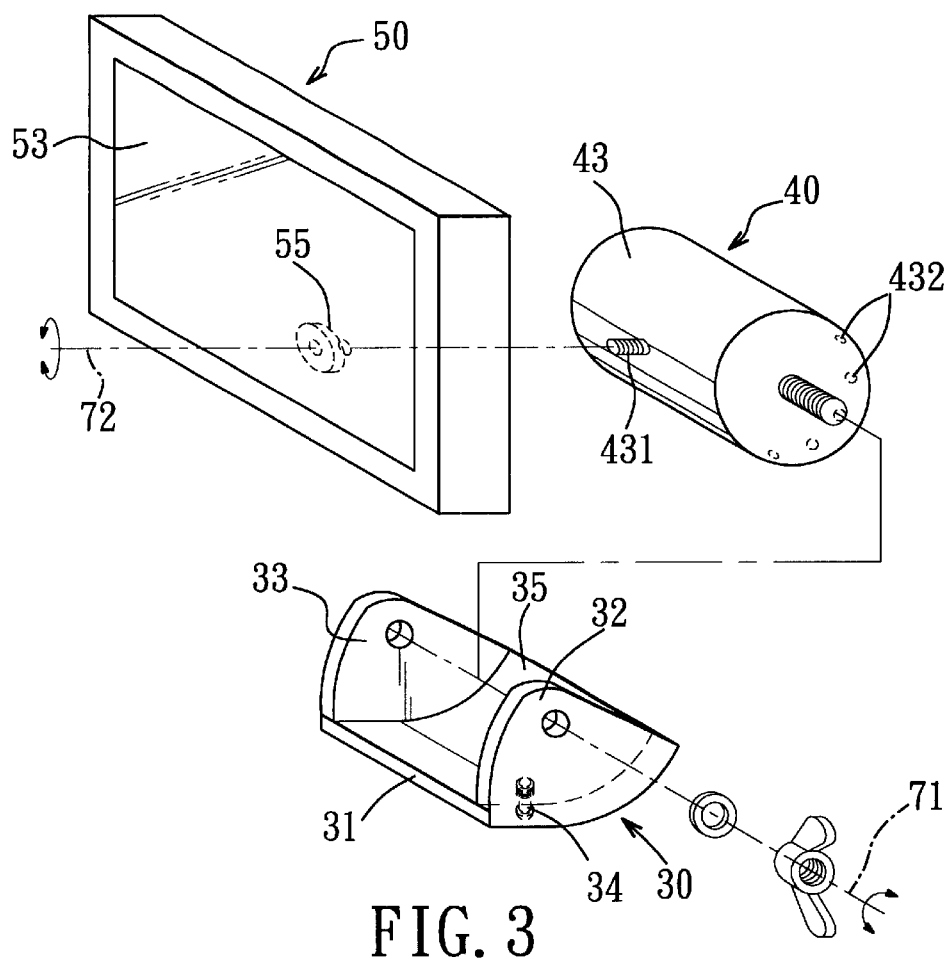
FIG. 3 is an exploded fragmentary perspective view of the preferred embodiment shown in FIG. 1.
Figure 4:
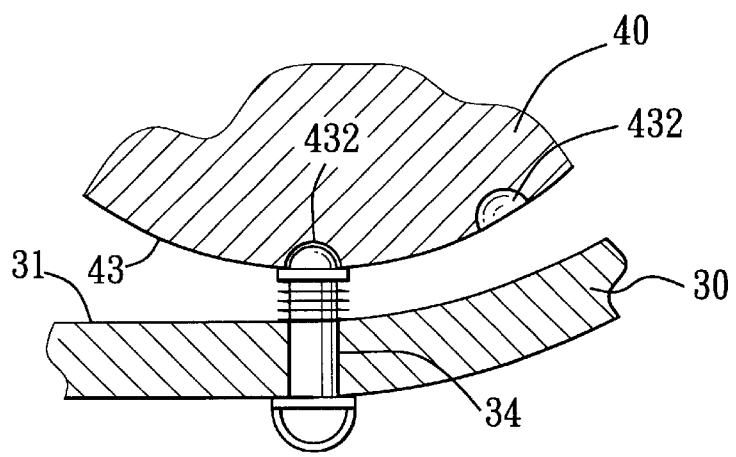
FIG. 4 is a partly sectional view of the preferred embodiment shown in FIG. 1, illustrating how a cylindrical outer surface is retained on a seat by a tongue-and-groove retaining device.

The tongue-and-groove retaining device in the preferred embodiment includes a row of uniformly spaced apart retaining holes 432 formed circumferentially in the cylindrical outer surface 43, and a spring-biased tongue 34 mounted on the bottom plate 31 and engaging a selected one of the retaining holes 432 in order to position the displaying face 53 at the selected angle relative to the vertical plane, as best shown in FIGS. 1 and 2.

Figure 5:
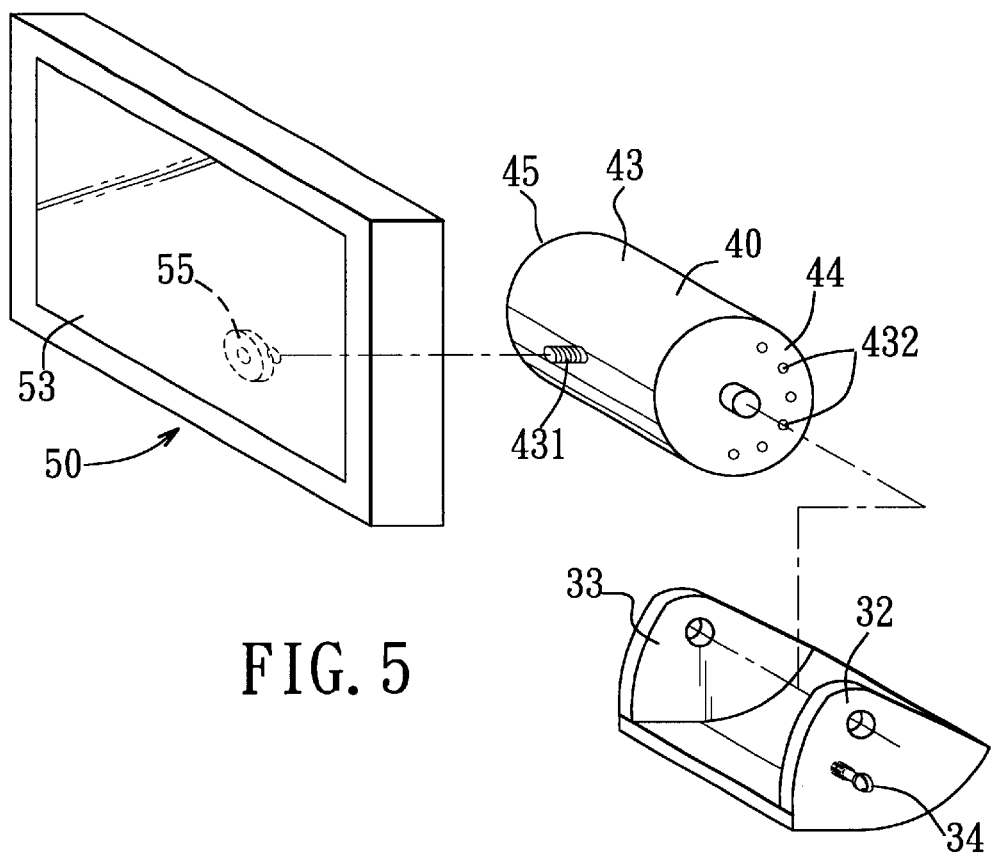
FIG. 5 is an exploded fragmentary perspective view of a modified preferred embodiment according to the present invention shown together with the display device.
Figure 6:
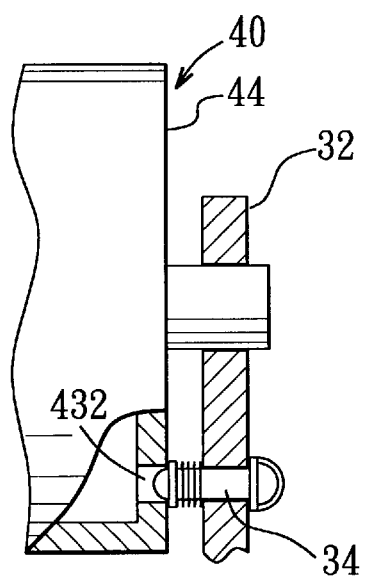
FIG. 6 is a partly sectional view of the modified preferred embodiment shown in FIG. 5, illustrating how the cylindrical outer surface is retained on the seat by the tongue-and-groove retaining device.

Referring to FIGS. 5 and 6, a modified preferred embodiment of the present invention is shown to have a structure similar to that of the previous embodiment. The main difference resides in that the axle 40 has two opposite end faces 44,45. The spring-biased tongue-and-groove retaining device includes a row of uniformly and angularly spaced apart retaining holes 432 formed in one of the opposite end faces 44 of the axle 40, and a spring-biased tongue 34 mounted on one of the upright mounting plates 32 and engaging a selected one of the retaining holes 441 in order to position the displaying face 53 at the selected angle relative to the vertical plane, as best shown in FIG. 6.

Since the specific structure of the display device 50 is not pertinent to the present invention, a detailed description of the same is omitted herein for the sake of brevity.

While the present invention has been described in connection with what is considered the most practical and preferred embodiments, it is understood that the present invention is not limited to the disclosed embodiments but is intended to cover various arrangements included within the spirit and scope of the broadest interpretation so as to encompass all such modifications and equivalent arrangements.

I claim:

1. A support unit adapted to support a display device having a displaying face, said support unit comprising:

a seat;

an axle mounted rotatably on said seat, defining a first axis that is adapted to be disposed parallel to the displaying face, and having a cylindrical outer surface surrounding said first axis, said axle being rotatable about said first axis relative to said seat;

a coupling unit adapted to interconnect the display device and said outer surface of said axle in a manner such that the display device is rotatable relative to said axle about a second axis that is transverse to said first axis and the displaying face; and an upright support member supporting said seat from below in such a manner that said seat is turnable relative to said upright support member about a third axis transverse to said first an and second axes; and wherein said seat includes two spaced apart upright mounting plates between which said axle is journalled, and a bottom plate disposed below said cylindrical outer surface, interconnecting said mounting plates, and having a curved extension which extends in a direction away from the display device and which confronts and conforms with said cylindrical outer surface, said support unit further comprising a spring-biased tongue-and-groove retaining device disposed between said bottom plate and said cylindrical outer surface for positioning the displaying face at a selected angle relative to a vertical plane.

2. The support unit as defined in claim 1, wherein said spring-biased tongue-and-groove retaining device includes a row of uniformly spaced apart retaining holes formed circumferentially in said cylindrical outer surface, and a spring-biased tongue mounted on said bottom plate and engaging a selected one of said retaining holes in order to position the displaying face at the selected angle relative to the vertical plane.

3. The support unit as defined in claim 1, wherein said axle has two opposite end faces, said spring-biased tongue-and-groove retaining device including a row of uniformly and angularly spaced apart retaining holes formed in one of said opposite end faces, and a spring-biased tongue mounted on a respective one of said upright mounting plates and engaging a selected one of said retaining holes in order to position the displaying face at the selected angle relative to the vertical plane.

4. A display device comprising:

a monitor having a displaying face; and a support unit including a seat;

an axle mounted rotatably on said seat, defining a first axis that is parallel to the displaying face, and having a cylindrical outer surface surrounding said first axis, said axle being rotatable about said first axis relative to said seat;

a coupling unit interconnecting said monitor and said cylindrical outer surface of said axle in a manner such that said monitor is rotatable relative to said axle about a second axis that is transverse to said first axis and the displaying face; and an upright support member supporting said seat from below in such a manner that said seat is turnable relative to said upright support member about a third axis transverse to said first and second axes; and wherein said seat includes two spaced apart upright mounting plates between which said axle is journalled, and a bottom plate disposed below said cylindrical outer surface, interconnecting said mounting plates, and having a curved extension which extends in a direction away from said monitor and which confronts and conforms with said cylindrical outer surface, said support unit further comprising a spring-biased tongue-and-groove retaining device disposed between said bottom plate and said cylindrical outer surface for positioning said displaying face at a selected angle relative to the vertical plane.

5. The display device as defined in claim 4, wherein said spring-biased tongue-and-groove retaining device includes a row of uniformly spaced apart retaining holes formed circumferentially in said cylindrical outer surface, and a spring-biased tongue mounted on said bottom plate and engaging a selected one of said retaining holes in order to position said displaying face at the selected angle relative to the vertical plane.

6. The display device as defined in claim 4, wherein said axle has two opposite end faces, said spring-biased tongue-and-groove retaining device including a row of uniformly and angularly spaced apart retaining holes formed in one of said opposite end faces of said axle, and a spring-biased tongue mounted on one of said upright mounting plates and engaging a selected one of said retaining holes in order to position said displaying face at the selected angle relative to the vertical plane.

7. A support unit adapted to support a display device having a displaying face, said support unit comprising:

an axle adapted to be connected to the display device, defining a first axis that is adapted to be disposed parallel to the displaying face, and having a cylindrical outer surface surrounding said first axis;

a seat including two spaced apart upright mounting plates between which said axle is journalled, and a bottom plate disposed below said cylindrical outer surface, interconnecting said mounting plates, and having a curved extension which extends in a direction away from the display device and which confronts and conforms with said cylindrical outer surface; and a spring-biased tongue-and-groove retaining device disposed between said bottom plate and said cylindrical outer surface for positioning the displaying face at a selected angle relative to a vertical plane.

8. The support unit as defined in claim 7, wherein said spring-biased tongue-and-groove retaining device includes a row of uniformly spaced apart retaining holes formed circumferentially in said cylindrical outer surface, and a spring-biased tongue mounted on said bottom plate and engaging a selected one of said retaining holes in order to position the displaying face at the selected angle relative to the vertical plane.

9. The support unit as defined in claim 7, wherein said axle has two opposite end faces, said spring-biased tongue-and-groove retaining device including a row of uniformly and angularly spaced apart retaining holes formed in one of said opposite end faces, and a spring-biased tongue mounted on a respective one of said upright mounting plates and engaging a selected one of said retaining holes in order to position the displaying face at the selected angle relative to the vertical plane.

* * * * *